United States Patent [19]

Maley

[11] 3,713,884
[45] Jan. 30, 1973

[54] METHOD FOR PREPARING A CONDUCTIVE COATING ON A GLASS SURFACE

[75] Inventor: James John Maley, Lancaster, Pa.
[73] Assignee: RCA Corporation
[22] Filed: Sept. 25, 1970
[21] Appl. No.: 75,552

[52] U.S. Cl. ............117/211, 117/33.5 C, 117/124 B
[51] Int. Cl. ..........................H01j 29/28, B44d 1/18
[58] Field of Search ......117/211, 124 A, 124 B, 201, 117/215, 159, 33.5 CP, 33.5 C

[56] References Cited

UNITED STATES PATENTS

| 3,005,731 | 10/1961 | Payne et al. | 117/211 |
| 3,331,702 | 7/1967 | Dates et al. | 117/211 |
| 3,138,734 | 6/1964 | Lineweaver | 117/211 X |

FOREIGN PATENTS OR APPLICATIONS

| 1,030,471 | 5/1958 | Germany | |
| 265,560 | 10/1968 | Austria | 117/211 |

OTHER PUBLICATIONS

Dalin et al. "WADC Tech. Report" 53-378, January 1954, page 23.

Primary Examiner—Ralph S. Kendall
Attorney—Glenn H. Bruestle

[57] ABSTRACT

Method includes applying to a glass surface, such as the inner surface of an electron-tube glass envelope, at room temperature a coating of an aqueous stannous chloride solution and heating the coated glass in an air atmosphere to a temperature in the range of 275° to 450°C.

4 Claims, 2 Drawing Figures

```
APPLYING TO A GLASS
SURFACE AT ABOUT ROOM
TEMPERATURE A COATING
OF AN AQUEOUS SOLUTION
OF STANNOUS CHLORIDE
```

```
HEATING THE COATED
GLASS SURFACE TO A
TEMPERATURE IN THE RANGE
OF 275°C TO 450°C IN AIR
```

PATENTED JAN 30 1973 3,713,884

INVENTOR.
James J. Maley
BY
Glenn H. Bruestle
ATTORNEY

METHOD FOR PREPARING A CONDUCTIVE COATING ON A GLASS SURFACE

BACKGROUND OF THE INVENTION

This invention relates to a method for preparing an adherent conductive coating on a glass surface and particularly, but not exclusively, to a method for preparing an adherent conductive coating on a glass envelope of an electron tube.

In one method for preparing an adherent electrically conductive tin-oxide coating on a glass surface, described in U. S. Pat. No. 2,118,795 to J. T. Littleton, a solution of stannic chloride, hydrochloric acid and water is applied to a hot glass surface with the glass at a temperature usually about 600° to 750°C. Although this process provides suitable conductive coatings on glass, it is not suitable for coating of partially fabricated tube structures and for uses in existing tube-fabricating processes. The high temperatures may damage fabricated tube structure or distort the glass.

In another method for preparing an adherent conductive tin-oxide coating on a glass surface, described in U. S. Pat. No. 3,005,731 to P. D. Payne, Jr., a solution of anhydrous stannous chloride ($SnCl_2$) in an organic solvent (not an aqueous solution) is coated on the glass surface at room temperature. Then, the coated glass is heated to at least 250°C. This process is not economically practical for coating partially fabricated tube structures since the use of an organic solvent requires time-consuming solution preparation, elaborate safety precautions, and special processing equipment.

SUMMARY OF THE INVENTION

The novel method includes applying a coating of an aqueous solution of stannous chloride to a glass surface at about room temperature. The coated glass is then heated in an air atmosphere to a temperature in the range of 275° to 450°C.

The novel method, unlike a prior process, uses an aqueous solution of stannous chloride ($SnCl_2$) applied to a glass surface at room temperature. The use of an aqueous solution of stannous chloride eliminates the need for heating the glass to a temperature at which fabricated tube structure may be damaged or at which the glass may distort. The use of an aqueous solution of stannous chloride ($SnCl_2$) applied to a glass surface at room temperature to obtain a conductive coating is surprising since in one previous method a conductive coating was prepared by applying an aqueous solution of stannic chloride ($snCl_4$) and hydrochloric acid to a hot glass surface.

The novel method also differs from another prior process since an aqueous solution of stannous chloride ($SnCl_2$) is applied to the glass surface. The use of an aqueous solution of stannous chloride eliminates time-consuming solution preparation, the use of hazardous solvents, and permits the use of existing processing equipment. This is also surprising since in another previous method it was necessary to apply a nonaqueous solution of stannous chloride ($SnCl_2$) and an organic solvent to glass at room temperature to obtain a conductive coating of stannous oxide.

DESCRIPTION OF THE PREFERRED EMBODIMENT

Figure 1:
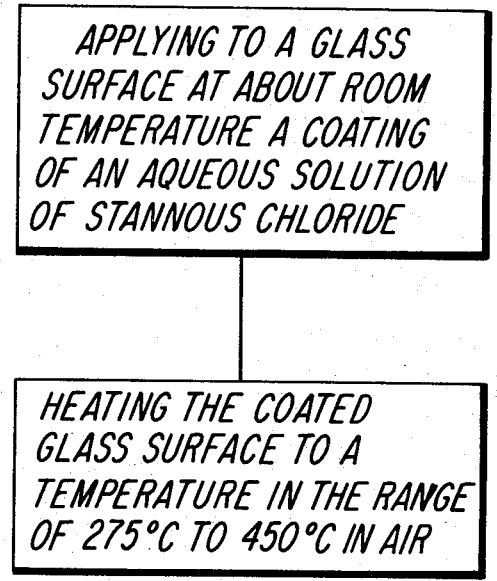
FIG. 1 is a flow diagram showing the steps of the novel method.

The flow-diagram of FIG. 1 shows the principal steps of the novel method, which are (a) coating a glass surface at room temperature with an aqueous stannous-chloride solution and then (b) heating the coated glass at a temperature of about 275° to 450°C in air.

EXAMPLE 1

In one embodiment of the novel method, a solution is prepared by dissolving about 50 grams of anhydrous stannous chloride ($SnCl_2$) in about 100 milliliters of water to produce a milky liquid. The liquid solution is then coated on the glass inner surface of a color-television-picture-tube funnel using standard spraying techniques. In spraying, it is preferred that the sprayed coating on the inner surface of the glass envelope appear as fine drops of liquid. If too much stannous-chloride coating is applied, the coating may run, and if too little stannous-chloride coating is applied, the coating may not uniformly coat the glass surface. It is preferred that the coating be applied in multiple layers to obtain the desired coating thickness. After the spray coating is applied, the coating may be allowed to air dry. Then, the glass funnel is heated in an air atmosphere to a temperature of about 350°C for about 30 minutes. The coated glass is then gradually cooled. The novel process results in an approximate 10-micron-thick adherent conductive stannous-oxide coating on the glass surface having a surface resistivity of approximately 10,000 ohms per square.

EXAMPLE 2

The same procedure as described in EXAMPLE 1 is followed except the glass funnel is heated to 275°C in an air atmosphere for at least 1 hour. The resulting stannous-oxide coating has approximately the same characteristics as the coating obtained in EXAMPLE 1 for the same coating thickness.

EXAMPLE 3

A water solution of approximately 25 grams of stannous chloride ($SnCl_2$) in about 100 milliliters of water is applied on the inner surface of a glass-electron tube envelope to form a coating approximately 5 microns thick. The glass envelope is then heated in an air atmosphere to approximately 275°C held at 275°C for about 30 minutes. The glass envelope is then cooled to room temperature, and the aforesaid process repeated a second time. The resulting stannous-oxide-coating characteristics are approximately the same as obtained in EXAMPLES 1 and 2 for the same final coating thickness.

In the preferred method, a coating of an aqueous solution of stannous chloride is applied to a glass surface at room temperature. Previously in one prior process where a coating of an aqueous solution of stannic chloride and hydrochloric acid is applied to hot glass (600° to 700°C), heating of the glass may damage the fabricated tube structure or distort the glass and result in a defective tube. This prior process will not provide a conductive coating when applied to a glass surface at room temperature. This prior process also uses a hydrated form of stannic chloride ($SnCl_4 \cdot 5H_2O$) in the solution, where in the preferred method anhydrous stannous chloride ($SnCl_2$) is used.

Previously in another prior process where a coating of stannous chloride ($SnCl_2$) and an organic solvent is applied to a glass surface, the solution must be prepared by rolling for approximately 8 hours to insure that all the stannous chloride is dissolved, and then the solution must be filtered. The use of this solution requires special safety precautions which are not necessary with the aqueous stannous chloride solution of the preferred method. The aqueous stannous chloride solution may also be processed with existing equipment of the type used for application of other conductive coatings such as graphite.

The coated glass is then heated at a temperature of about 275° to 450°C in air. Temperatures below 275°C are insufficient to produce a conductive coating of stannous oxide. Temperatures above 450°C produce conductive stannous oxide coatings but are undesirable for most tube-making processes because they are not generally used and because they degrade the performance of other structures in the tube. The duration of heating is determined empirically. Generally, the higher the heating temperature, the shorter the required heating time.

Figure 2:
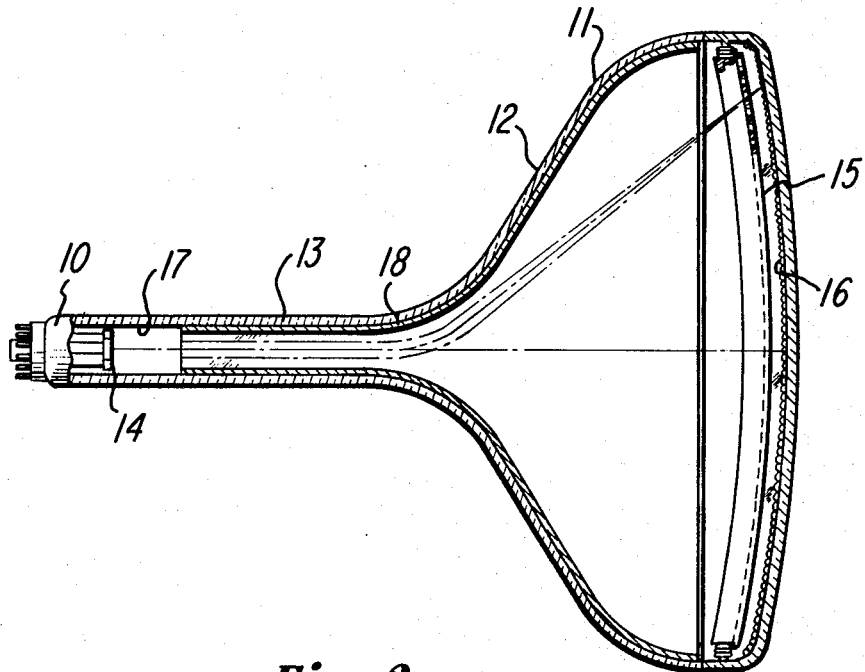
FIG. 2 is a sectional elevational view of a cathode-ray tube illustrating the position of the conductive coating produced by the novel method.

The color-television-picture tube 10 illustrated in FIG. 2 comprises a glass envelope 11 having a funnel portion 12 and a neck portion 13. An electron-gun assembly 14 in the neck portion 13 is adapted to project an electron beam through an apertured mask 15 incident upon a phosphor screen 16 during the operation of the tube. The inner surface 17 of the funnel portion 12 and neck portion 13 carries a conductive coating 18 applied by the novel method.

Although a coating thickness of approximately 10 microns is preferred, other thicknesses may be produced. Variations in solution concentrations and coating thicknesses can be used to produce different conductive film resistivity values.

I claim:

1. A method for preparing an adherent conductive film on a glass surface comprising the steps of
    1. applying to said glass surface at about room temperature a coating of a solution of stannous chloride dissolved in a solvent consisting essentially of water
    2. and heating said coated glass in an air atmosphere to a temperature in the range of 275° to 450°C.

2. The method of claim 1 wherein said glass is heated in an air atmosphere to a temperature of about 350°C and then maintained at said temperature about 30 minutes.

3. The method of claim 1 wherein said glass is heated in an air atmosphere to a temperature of about 275°C and then maintained at said temperature about 1 hour.

4. The method according to claim 1 wherein the glass surface is the inner surface of a cathode-ray-tube envelope, and step (1) comprises:
    coating a portion of the inner surface of said envelope with said aqueous solution of stannous chloride.

* * * * *

UNITED STATES PATENT AND TRADEMARK OFFICE
CERTIFICATE OF CORRECTION

PATENT NO. : 5,713,884
DATED : February 3, 1998
INVENTOR(S) : Thomas W. Osborn, III, et al.

It is certified that error appears in the above-identified patent and that said Letters Patent is hereby corrected as shown below:

Column 80, line 66, after "panties" insert --and--.

Column 81, line 2, "external" should read --extending--.

Signed and Sealed this

Fifteenth Day of May, 2001

Attest:

NICHOLAS P. GODICI

Attesting Officer     Acting Director of the United States Patent and Trademark Office